United States Patent
Shiller

[15] 3,692,415
[45] Sept. 19, 1972

[54] PHOTOMETRIC ANALYZER EMPLOYING FIBER OPTIC LIGHT TRANSMITTING MEANS

[72] Inventor: John W. Shiller, 8264 Bingham St., Detroit, Mich. 48228

[22] Filed: March 22, 1971

[21] Appl. No.: 126,761

[52] U.S. Cl. .................356/187, 250/227, 356/87
[51] Int. Cl. .........G01j 3/48, G01n 21/58, G01j 3/30
[58] Field of Search .................250/227; 356/87, 187

[56] References Cited

UNITED STATES PATENTS

| | | | |
|---|---|---|---|
| 3,489,498 | 1/1970 | Brody et al. | 356/187 |
| 3,374,950 | 3/1968 | Menzel et al. | 250/227 |

OTHER PUBLICATIONS

Instrumental Reduction of Background Signal of Fuel–Rich Oxcyacetylene Flames Used in Atomic Absorption Spectrometry; Winefordner et al; Analytical Chemistry; Vol. 36  4 April 64; pp. 943– 944

*Primary Examiner*—Ronald L. Wibert
*Assistant Examiner*—V. P. McGraw
*Attorney*—Plante, Hartz, Smith & Thompson, Bruce L. Lamb and William G. Christoford

[57] ABSTRACT

Photometric analyzer having a reaction chamber for exciting samples by thermal, chemical or other energy to emit characteristic light, the reaction chamber usually being operated at elevated temperature. A photometric light sensor is located remotely from the chamber away from the influence of heat therefrom. Characteristic light is transmitted from the chamber to the photometric light sensor by a fiber optic bundle.

4 Claims, 2 Drawing Figures

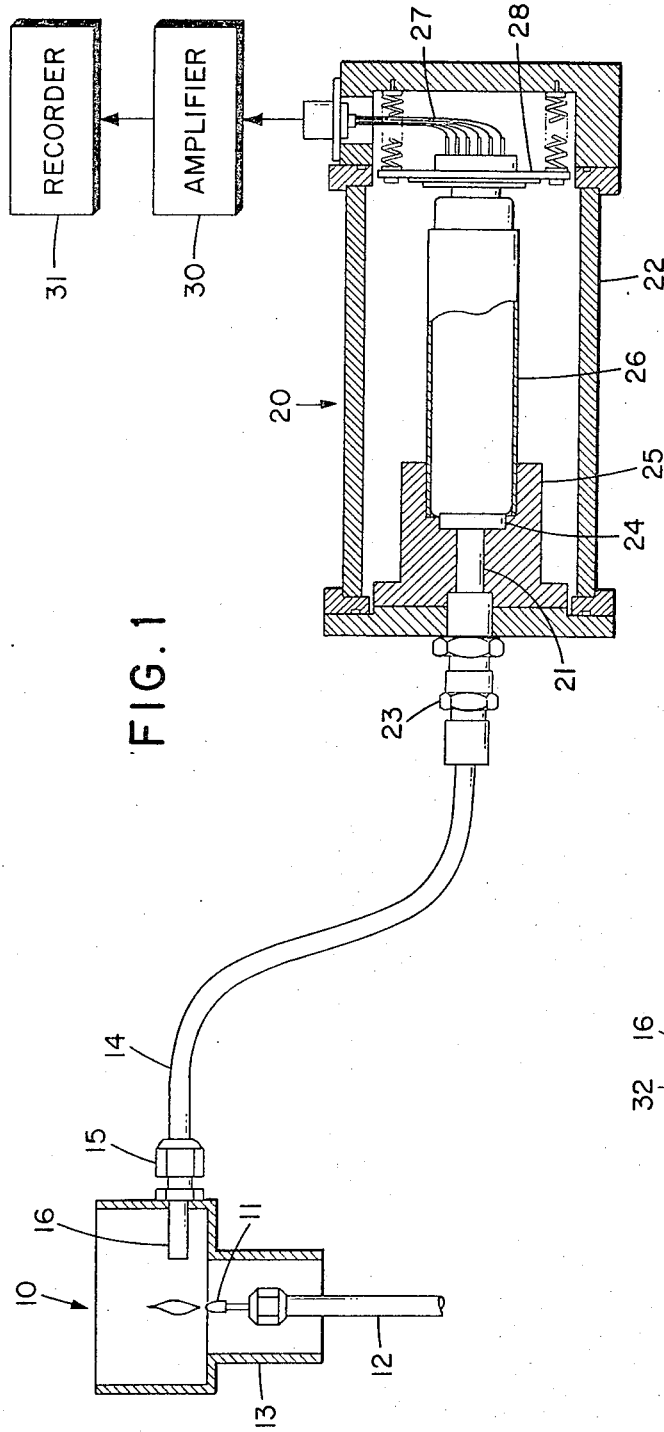
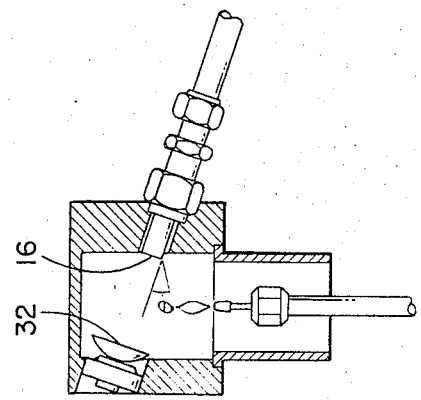
FIG. 1
FIG. 2
INVENTOR
JOHN W. SHILLER
BY *Bruce L. Lamb*
ATTORNEY

3,692,415

PHOTOMETRIC ANALYZER EMPLOYING FIBER OPTIC LIGHT TRANSMITTING MEANS

The prevent invention relates to analytical apparatus employing photometric techniques.

Photometry has been found to be an effective method for analyzing mixtures or compounds containing small concentrations of a substance or substances to be identified. Air or other gas containing sulfur or phosphorus compounds has been quantitatively analyzed by burning sample gas in a hydrogen rich atmosphere and observing a selected zone of the flame for specific colorations. For an example of such a method reference may be made to U.S. Pat. No. 3,213,747. The photometric technique may also be used for detecting aerosol articles as in U.S. Pat. No. 2,730,005 or for a variety of elements in gases or solutions by substituting different combustible or carrier gases in the flame and by using different optical filters responsive to the light characteristic of the spectrum of the substance being studied. More recently methods involving chemiluminescent reactions have been employed for the analysis of gases containing nitric oxide and ozone.

The flame cells of flame photometers necessarily and the reaction chambers of chemiluminescent analyzers desirably operate at temperatures substantially higher than ambient. The heat of such cells in conventional apparatus is conveyed by conduction, convection or radiation to the optical filter and photometric light sensor, usually a photomultiplier tube in the more sensitive instruments, where it has the undesirable effect of heating the filter and increasing the dark noise of the sensor. The dark noise of the sensor is the noise therein when all external luminous flux is shielded from the photoemissive element or elements of the sensor. If, in prior instruments, the photometric light sensor is shown as being located some distance from the flame or reaction where it is less subject to heat from the cell, it will likewise appear that a fairly elaborate optical system is provided to transmit light from the area of interest to the sensitive surface of the sensor. Such systems restrict the choice of location of the sensor relative to the cell and require some degree of care in handling and maintenance to preserve alignment and cleanliness.

Accordingly it is an object of the invention to provide a photometric analytical instrument in which the photometric light sensor and optical filter are removed from the source of heat constituted by a flame cell or reaction chamber whereby the signal to noise ratio of the instrument is substantially improved, and likelihood of damage to the filter is much reduced.

Another object of the invention is to provide a photometric analytical instrument in which there is available a wide degree of choice of location of the photometric detector relative to the light source under observation.

A further object of the invention is to provide a photometric analytical instrument which affords selectivity in viewing particular zones or area of the reaction being studied.

Briefly, the invention comprises a photometric analytical instrument in which light from a flame cell or reaction chamber is conducted to a remotely located photometric detector by a fiber optic bundle. The temperature of the flame cell or reaction chamber can be maintained at an elevated temperature without the adverse effects which accompany locating the photometric detector proximate the flame cell. Since the fiber optic bundle can be shaped almost without limitation to follow any desired path and the light will be conducted therealong with only small losses, a wide range of choice in the location of the detector relative to the cell is afforded. Further design control over the characteristics of the instrument may be exercised by orienting the entrance end of the fiber optic bundle so that a particular area of the luminous source may be observed and by specifying the fiber optic material and dimensions, thus determining the numerical aperture and field of view.

IN THE DRAWINGS

FIG. 1 is a simplified sectional elevation of the invention as embodied in a flame photometer with other elements thereof shown as functional blocks; and FIG. 2 is a sectional view of a modification of the flame cell of FIG. 1 showing a different orientation of the entrance end of the fiber optic bundle.

FIG. 1 illustrates the invention as applied to an analytical instrument of the flame photometer type. A flame cell 10 includes a burner nozzle 11 which is fed a mixture of combustible gas and sample gas through a supply pipe 12. The flow rates of sample and combustible gases are regulated by means not shown. Electrical means (not shown) are customarily provided for igniting the flame. The nozzle and flame are surrounded by a chimney 13 which may be of substantial mass whereby the temperature of the interior space of the cell will stabilize at a value substantially higher than ambient. A fiber optic bundle 14 passes through the wall of chimney 13 and is secured in place by a light tight gland fitting 15 so that the entrance end 16 of the bundle views a selected area of the flame.

Light from the flame impinging upon the entrance end of the bundle is conducted thereby to a remotely located photometric detector 20. The bundle 14 is encased in a light tight sheath, which may suitably be thin walled or flexible convoluted stainless steel tubing, to prevent the entrance of extraneous light. The exit end 21 of the bundle passes through a wall of the light tight housing 22 of detector 20 and is secured in place by a gland-type fitting 23, the latter also being light tight.

Bundle end 21 terminates within housing 22 in abutment with an optical filter 24 contained by a light sensor mounting block 25. The light sensor 26, suitably a phototube of the photomultiplier type, is responsive to light transmitted by filter 24 and entering the tube axially. A tube socket 27 and mounting board 28 supports the opposite end of the tube 26 and provides connections to tube electrodes for various potential inputs and signal current output. Signal output from the tube is amplified 30 and displayed or recorded 31, as may be desired.

In the modification of FIG. 2, the fiber optic bundle is shown entering the flame cell cell obliquely. Light incident upon the entrance end 16 at an angle greater than the acceptance angle $\theta$ of the fibers will be rejected rather than transmitted by the bundle. Consequently, the embodiment of FIG. 2 is designed for study of light emanating from a zone above the continuously luminous portion of the flame. If desired, a mirror 32 of appropriate optical design may be used to increase the luminous flux transmitted by the bundle. The characteristics of the fiber material determines the value of the acceptance angle $\theta$, so that by selecting appropriate fiber materials and orientation angles specific zones of luminosity may be examined.

The operation of the instrument is identical with those of known construction. Filter 24 is selected to pass the spectral band characteristic of the light emitted by the substance being investigated. Following calibration of the instrument by recording the amplified signal output obtained with known concentrations and gas flow rates the unknown sample is introduced in the gas stream and the concentration of substance in interest is obtained directly from the recorder chart. The significant different between this and other instruments appears with the concentrations of the substance of interest are very weak. Formerly the signal peaks under such circumstances would be masked or be indistinguishable from the background noise of the tube. A substantial reduction in such noise is afforded by the invention, so that weak signal peaks can be recognized and reliably interpreted, thereby substantially increasing the sensitivity of the instrument. Also, the versatility of the instrument is increased because of the selective view obtained by orienting the entrance end of the fiber optic bundle and the danger of damaging optical filters by heat is eliminated.

The invention claimed is:

1. Analytical apparatus of the photometric type comprising a reaction chamber having means for exciting a sample to be analyzed to cause emission of light characteristic of a particular composition of said sample, means responsive to light to produce a signal indicative of the intensity of said light, said light responsive means being located remotely from said reaction chamber so as to be substantially removed from the influence of heat from said chamber, and flexible fiber optic means for transmitting light from said chamber and for substantially blocking the transmission of heat therefrom, said fiber optic means having an entrance end exposed to receive light from said chamber and an exit end positioned to direct light transmitted by said fiber optic means upon said light responsive means.

2. Apparatus as claimed in claim 1 wherein said reaction chamber and said light responsive means are maintained at substantially different temperatures.

3. Apparatus as claimed in claim 1 with additionally a light filter interposed in the path of light transmitted by said fiber optic means, said filter passing a spectral band of interest and rejecting other light whereby said light responsive means is exposed only to light characteristic of a particular composition of said sample.

4. Apparatus as claimed in claim 1 wherein said fiber optic means possesses a limited acceptance angle at said entrance end and wherein said entrance end of said fiber optic means is oriented with respect to said reaction chamber to accept and transmit only light emanating from a particular zone within said chamber and to reject light emanating from zones in said chamber other than said particular zone.

* * * * *